US008224850B2

(12) United States Patent
Kelley et al.

(10) Patent No.: US 8,224,850 B2
(45) Date of Patent: Jul. 17, 2012

(54) METHOD AND SYSTEM FOR DETERMINING USERS THAT SATISFY DESIRED CONDITIONS

(75) Inventors: Sean Kelley, Barrington, IL (US); Bin Hu, Los Altos, CA (US)

(73) Assignee: Motorola Mobility, Inc., Libertyville, IL (US)

( * ) Notice: Subject to any disclaimer, the term of this patent is extended or adjusted under 35 U.S.C. 154(b) by 745 days.

(21) Appl. No.: 12/191,055

(22) Filed: Aug. 13, 2008

(65) Prior Publication Data

US 2010/0042601 A1 Feb. 18, 2010

(51) Int. Cl.
G06F 7/00 (2006.01)
(52) U.S. Cl. ......... 707/781; 707/732; 707/623; 709/231
(58) Field of Classification Search .................. 707/623, 707/781; 709/231
See application file for complete search history.

(56) References Cited

U.S. PATENT DOCUMENTS

| | | | | |
|---|---|---|---|---|
| 6,657,595 | B1 | 12/2003 | Phillips et al. | |
| 2006/0053208 | A1* | 3/2006 | Laurila et al. | 709/206 |
| 2006/0235981 | A1* | 10/2006 | Westman et al. | 709/227 |
| 2007/0043692 | A1* | 2/2007 | Oh et al. | 707/1 |
| 2007/0124294 | A1 | 5/2007 | Sun et al. | |
| 2007/0136475 | A1 | 6/2007 | Leppisaari et al. | |
| 2007/0161393 | A1* | 7/2007 | Wu et al. | 455/521 |
| 2007/0162588 | A1* | 7/2007 | Wu et al. | 709/223 |
| 2007/0232367 | A1 | 10/2007 | Kasha et al. | |
| 2008/0183800 | A1* | 7/2008 | Herzog et al. | 709/202 |
| 2008/0201221 | A1* | 8/2008 | Laurila | 705/14 |
| 2008/0281931 | A1* | 11/2008 | Oh et al. | 709/206 |

OTHER PUBLICATIONS

Ishikawa et al., 1st International Workshop on Web Dynamics in conjunction with the 8th International Conference on Database Theory London, UK, Jan. 3, 2001, pp. 1-10.*

Open Mobile Alliance; "Condition Based URIs Selection Requirements"; Candidate Version 1.0—Jul. 10, 2009; XP-002558513; 24 pages.
Open Mobile Alliance; "Condition Based URIs Selection Requirements"; Draft Version 1.0—Aug. 11, 2008; XP-002558512; 20 pages.
Patent Cooperation Treaty; "Notification of Transmittal of the International Search Report and the Written Opinion of the International Searching Authority, or the Declaration"; International Application No. PCT/US2009/051896; International Filing Date Jul. 28, 2009; Date of Mailing Dec. 10, 2009; 16 pages.
Open Mobile Alliance Ltd., 2008; Work Item document; "Condition Based URIs Selection" ; 6 pages.
Open Mobile Alliance Ltd., Work Item document, "Condition Based URIs Selection"; Apr. 1, 2008; 6 pages.

* cited by examiner

*Primary Examiner* — Cheyne Ly
(74) *Attorney, Agent, or Firm* — Whyte Hirschboeck Dudek S.C.

(57) ABSTRACT

A method and system are disclosed allowing for determining those users of multiple users who satisfy desired condition(s), where characteristics of the users in at least some embodiments vary dynamically. In at least one embodiment, the method includes receiving at a server device a request for a determination regarding which of a plurality of users satisfies a plurality of conditions respectively relating to a plurality of user characteristics, and obtaining at the server device a conditions specification. Additionally, the method includes accessing at least one repository in which is stored information regarding the users to obtain at least some of the information, the information concerning the user characteristics. The method also includes making a determination regarding which of the users satisfies the plurality of conditions, obtaining at the first server device updated information from the at least one repository, re-evaluating the determination, and sending output information regarding the re-evaluated determination.

17 Claims, 3 Drawing Sheets

METHOD AND SYSTEM FOR DETERMINING USERS THAT SATISFY DESIRED CONDITIONS

FIELD OF THE INVENTION

The present invention relates to digital communications and, more particularly, to digital communications involving telecommunication networks.

BACKGROUND OF THE INVENTION

The Open Mobile Alliance (OMA) has defined an extensible markup language (XML) document management (XDM) enabler for providing various user-specific services to various service enablers. The XDM enabler defined by OMA also supports the creation of XML documents by end-users and the storage of such XML documents in network repositories called XML Document Management Servers (XDMS). Once created, the service enablers and various other entities in a communication network can access those documents in order to personalize user services provided by the XDM enabler.

Notwithstanding the advantages provided by the XDM enabler, it nevertheless has certain limitations. First, the information/documents stored by the XDMS are static or semi-static in nature, which once created are almost never changed. Further, conventional manners in which such information/documents are used to provide personalized user services often fail to provide up-to-date results. Additionally, the XDM enabler does not create its own documents, and user documents managed by XDM are permanently stored until deleted, resulting in inefficient utilization of network resources.

It would therefore be advantageous if an improved system and method of providing personalized user services was developed and, in at least some embodiments, eliminated or mitigated one or more of the above-described limitations associated with conventional systems employing conventional XDM enablers and/or XDMS.

SUMMARY OF THE INVENTION

In at least some embodiments, the present invention relates to a method. The method includes receiving at a first server device a request for a determination regarding which of a plurality of users satisfies a plurality of conditions respectively relating to a plurality of user characteristics, the request being received from a first client device via a network, and obtaining at the first server device a specification of the conditions. Additionally, the method further includes accessing at least one repository in which is stored information regarding the plurality of users to obtain at least some of the information, the information concerning the plurality of user characteristics of the plurality of users. Further, the method also includes making a determination regarding which of the plurality of users satisfies the plurality of conditions, obtaining at the first server device updated information from the at least one repository, re-evaluating the determination, and sending output information regarding the re-evaluated determination for receipt by the first client device Additionally, in at least some embodiments, the present invention relates to a method. The method includes receiving at a first server device a request for a condition based URI list (CBUL) regarding which of a plurality of users satisfies a plurality of conditions respectively relating to a plurality of user characteristics, the request being received from a first client device via a network, obtaining at the first server device a specification of the conditions, and accessing at least one repository in which is stored information regarding the plurality of users to obtain at least some of the information, the information concerning the plurality of user characteristics of the plurality of users. The method further includes making a determination as to which of the plurality of users satisfies the plurality of conditions, and sending the CBUL regarding the determination for receipt by the first client device. The method additionally includes receiving a re-evaluation request from the first client within a period of time subsequent to the sending of the CBUL, obtaining updated information concerning the plurality of user characteristics from the at least one repository, making an additional determination as to which of the plurality of users satisfies the plurality of conditions, and sending an updated CBUL regarding the additional determination for receipt by the first client device.

Additionally, in at least some embodiments, the present invention relates to a system. The system includes a first server device capable of communicating with a first client device via at least one network connection and also capable of communicating with at least one repository of user characteristics regarding a plurality of users, and a second server device that is in communication with the first server device and that is configured to store a plurality of condition documents. The first server device receives a signal indicative of a request for a condition based URI list (CBUL) from the first client device via the at least one network connection. Upon receiving the signal the first server device fetches a first of the condition documents and further communicates with the at least one repository to obtain information regarding the user characteristics of at least some of the plurality of users. The first server device then further makes a determination as to which of the users satisfy one or more conditions specified in the first condition document and, upon making the determination, sends an additional signal indicative of the CBUL generated based upon the determination.

DETAILED DESCRIPTION OF THE INVENTION

Figure 1:
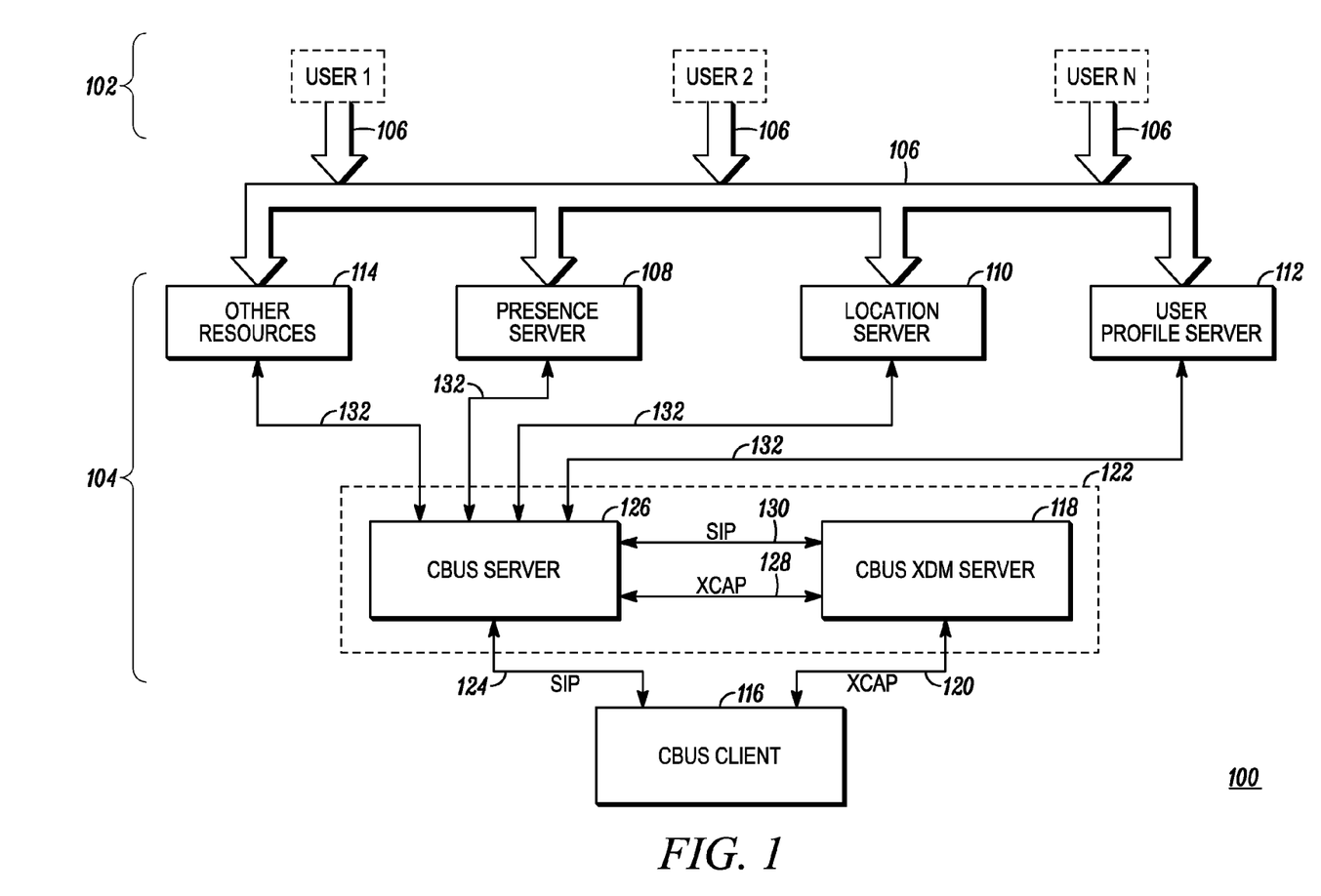
FIG. 1 shows in schematic form an exemplary communication system involving a plurality of users capable of communicating with a data network, in accordance with at least some embodiments of the present invention.

Referring to FIG. 1, a block diagram of an exemplary communications system 100 is shown in a simplified schematic form, in accordance with at least some embodiments of the present invention. As shown, the communications system 100 includes a plurality of user devices (or simply users) 102, each of which is in communication with a data network 104 via a communication link 106 (or multiple links). The plurality of users 102 are representative of communication devices operated by persons (or possibly by other entities requiring communication capabilities, such as computers), for example, cellular telephones, other wireless devices such as personal digital assistants, and/or devices such as laptops and desktop computers that are capable of connecting to and communicating with a network such as the data network 104. By way of the communication link 106, the plurality of users 102 can provide a wide variety of user-specific information to the data network 104 to enable or facilitate communications with various other entities (e.g., other users, service providers, etc.) that are within the data network or in communication therewith.

For example, each of the plurality of users 102 can provide information that conveys the ability and willingness of that user to communicate with other entities that are within the data network 104 or in communication therewith. Such information, often termed presence information, can include a user's availability record. Commonly utilized indicators of presence information can also include graphic symbols or icons with easy-to-convey meanings and/or a list of text descriptions such as "available", "free for chat", "busy", "away", "do not disturb", "out to lunch", etc. The presence information can be provided from the users 102 via the communication link 106 to a presence service, which operates and stores the presence information on a presence server 108. Thus, each of the plurality of users 102 can provide and publish a presence state to indicate its current communication status (e.g., availability and willingness to communicate), which is accessible by one or more other users (or other entities) within the data network 104 or in communication therewith.

In addition to the presence information, each of the plurality of users 102 can provide location information conveying the geographical position of the user communication device, and hence the geographical position of the person having the user communication device. Location information can also be useful insofar as such information can be employed to determine the location of a user relative to some other entity, for example, to discover the Starbucks Coffee location closest to the user or the whereabouts of a friend or coworker relative to the user. Any of a wide variety of technologies including, for example, Bluetooth, Global Positioning System (GPS), Wireless Local Area Network (WLAN), Infrared, and Radio Frequency Identification (RFID) technologies, can be used for determining the locations of the users 102. In other embodiments, other technologies including both GPS-dependent and GPS-independent technologies (e.g., operator based) can be used as well. While the accuracy (e.g., the specificity) of the location information that is available about users can vary depending upon the embodiment, in at least some embodiments, the location information is highly specific and identifies, in substantially real-time, the exact locations (e.g., to within only a few feet) of the users as can be determined using GPS technology. Similar to the presence information, the location information can be provided from the users 102 via the communication link 106 to a location service which operates and stores the location information on a location server 110. Thus, each of the plurality of users 102 can provide location information to the location server 110 that can then be accessed by others of the users or other entities that are in the data network 104 or in communication therewith.

In conjunction with providing the presence and location information, each of the plurality of users 102 has additional capabilities for creating a user profile. The user profile can include personal user-specific information such as information (often static or semi-static information) regarding gender, age, address, hobbies, occupations, likes, dislikes, and so on. Similar to the presence and location information, the user profile information can be provided from the users 102 via the communication link 106 to a user profile service, which operates and stores the user information profile on a user profile server 112 within the data network 104. Thus, each of the plurality of users 102 can provider user profile information to the user profile server 112 that can then be accessed by others of the users or other entities that are in the data network 104 or in communication therewith.

Notwithstanding the fact that in the present embodiment, each of the presence, location, and user profiles services and associated in formation are operated and stored on respective dedicated servers, namely, the presence, location, and user profile servers 108, 110, and 112, respectively, it will be understood that this need not always be the case. Rather, in other embodiments, each of those services can be stored, or alternatively distributed, on multiple servers for sharing that information with other entities of the network. A single server capable of storing all of the presence, location, and profile services can be utilized as well in alternate embodiments. Further, it will be understood that although only the presence, location, and user profiles services have been described in the present embodiment, in other embodiments additional information can be provided by the users 102 that can be stored within the data network 104 as well. Entities for storing such additional information have been represented in the present embodiment as other resources 114, which can include one or more servers in the network and can receive information from the users 102 via the communication link 106 as well as be accessed by the users or other entities that are in the data network 104 or in communication therewith.

With respect to the communication link 106, which facilitates communication among the plurality of users 102 and the data network 104, and particularly among the plurality of users and the presence, location, user profile servers 108, 110, 112, respectively, and the other resources 114, this link can include one or more of any of a wide variety of communication links or network interfaces. For example, in at least some embodiments, the communication link 106 can include landline (e.g., copper) wiring, optical fiber, microwave communication, a radio channel, a wireless communication link, the internet, and/or the World Wide Web. In other embodiments, other types of communication links for facilitating the transfer of signals between the plurality of users 102 and the data network 104 can be utilized as well.

By virtue of the plurality of users 102 providing the presence, location, and profile (as well as possibly other) information (collectively referred to hereinafter as "user-specific information") and storing that information into the presence, location, and user profile servers, 108, 110, and 112, respectively (as well as possibly the other resources 114), that information can be accessed and used by other entities that are part of, or interconnected with, the data network 104. Among these entities for which such user-specific information can be valuable are service enablers or service requesters that, when granted access to such user-specific information (e.g., by subscription to the data network 104), can access that information in order to personalize user services.

Personalization of user services in particular can be accomplished by defining various configurable conditions and/or rules and applying those conditions/rules with respect to the user-specific information so as to produce a list of users (particularly the uniform resource identifiers (URIs) reflecting those users) that match those defined conditions/rules from the pool of the plurality of users 102. That is, depending upon the condition/rules provided as input to the data network 104, a group of the users 102 can be returned back as output. This manner of operation can be termed condition based URI selection (CBUS), and the list that is produced can be termed a condition based URI List (CBUL).

More particularly in this regard, and further as shown in FIG. 1, any entity within the data network 104 capable of defining appropriate conditions/rules and/or capable of requesting a CBUL can appropriately be termed a condition based URI selection (CBUS) client 116. Often, the CBUS client 116 is a client entity residing in user equipment (UE) or on an application server, although in other embodiments, the CBUS client can be any service requester or service enabler capable of accessing (e.g., by subscription) the data network 104 and various features thereof. For example, the CBUS client 116 can include one or more mobile terminals, XDM clients, Push-to-Talk over Cellular (PoC) clients or servers, and mobile advertising servers. Other clients as well as servers can also be CBUS clients. Indeed, in at least some embodiments, one or more of the users 102 that provide user-specific information can also doubly constitute CBUS clients.

As indicated above, the CBUS client 116 is capable of creating and defining various conditions and/or rules for determining a CBUL. Insofar as the CBUS client 116 defines the conditions/rules for determining the CBUL, those conditions/rules are configurable conditions that can be modified at any time by the CBUS client and can be tailored to the specific needs of the CBUS client and the targeted user community. These conditions and/or rules can be defined in a document and, more particularly, in a condition description (CD) document, which often has a structure of an extensible markup language (XML) document.

The structure and/or contents of a CD document can vary depending upon the embodiment. Although as mentioned above the CD document typically will include conditions and/or rules, in at least some cases the CD document can initially specify a pre-defined member list that lists a subset of users from the overall pool of the users 102 that are eligible for inclusion in the CBUL. Such a pre-defined member list (which should not be confused with the ultimate CBUL, which is identified based upon the application of the conditions/rules specified in the CD document) can be defined, for example, such that the CBUS process for determining the CBUL based upon conditions/rules is restricted in its application to a limited subset of the overall pool of the users 102, even possibly to a single one of the users. Alternatively, no pre-defined member list need be specified by the CD document, and rather an "open-list" approach can be taken in applying the CBUS process, such that all identifiable users (at least within a given domain such as the data network 104) are considered when applying the conditions and/or rules specified by the CD document.

As mentioned above, each CD document also can (and typically does) specify various types of conditions and/or rules. To begin, as discussed in further detail below, in the present embodiment one or more CD documents upon being created by CBUS clients such as the CBUS client 116 are stored in the data network 104, where those CD documents potentially can be used by multiple users or other entities. Although in some cases the CD documents are generally used by all inquiring entities, this need not be the case. Rather, in at least some embodiments, a given CD document can contain authorization rules for limiting the use of the CD document to certain inquiring entities. For example, in at least some embodiments, certain of the clients such as the CBUS client 116 are able to use a particular CD document when making a request for a CBUL to which that CD document corresponds, while other CBUS clients are not able to do so, in accordance with the authorization rules of that CD document. Further, in still other embodiments, the authorization rules of a CD document can govern not only which inquiring entities are able to use the CD document when making CBUL requests, but also (or instead) govern which entities are able to create and modify contents of the CD document.

Additionally, each CD document also can (and typically will) contain one or more selection rules identifying the criteria (e.g., conditions/rules) for filtering the plurality of users 102. The selection rules can include, for example, rules specifying particular presence, location and/or user profile characteristics that need be met by a given one of the users 102 in order for that user to be included within the CBUL. Further, trigger rules which define criteria for notifying the CBUS client 116 in the case of changes to the CBUL when condition re-evaluation (described in greater detail below) has been requested can be included in the CD document as well. The trigger rules can include any of a variety of different types of rules that govern whether and/or when updated version(s) of the CBUL are to be provided to a CBUS client such as the CBUS client 116 because changes have occurred in the presence, location or user profile characteristics (or other characteristics) of the users 102 that can result in a change in the outcome of the application of the selection rules of the CD document. The trigger rules can, for example, take the form of a rule that the CBUS client should be notified when a certain number (e.g., 10 or, alternatively, all) of the users in the member list satisfy the selection rules, or alternatively should be notified every ten minutes (in which case the CBUS server aggregates the changes until the trigger rules are met). Notwithstanding the various attributes of the CD document described above, it will be understood that various other attributes, including various conditions and/or rules for performing the CBUS functionality can be provided in the CD document as well.

Further as shown in FIG. 1, upon creation of a CD document by a CBUS client such as the CBUS client 116, that document is then sent to the data network 104 and, more particularly in the present embodiment, sent to a CBUS XML data management (XDM) server (XDMS) 118, by way of a communication link 120. Upon being received at the XDMS 118, the CD document is stored therein. In accordance with the XDM specification defined by the Open Mobile Alliance (OMA), the XDMS 118 in turn allows CBUS clients such as the CBUS client 116 that have properly subscribed to the data network 104 to access, manipulate and change the CD documents stored therein, in accordance with the XDM specification, by performing actions such deleting, changing, and updating. The XDMS 118 can also allow CBUS clients to request notification of any changes made to the CD documents in order to be made aware of any such changes in real time. Thus, the CBUS XDMS 118 allows CBUS clients such as the CBUS client 116 to store CD documents therein, as well as access, manipulate and manage the CD documents stored therein.

The storage and manipulation of the CD document particularly in the present embodiment is achieved in accordance with an XML data management protocol, such as, the XML configuration access protocol (XCAP). The XCAP protocol is defined by the Internet Engineering Task Force (IETF) and enables access and manipulation of individual XML elements and attributes of the CD document (which as indicated above is an XML document). As such, authorized CBUS clients can create, change, and delete CD documents and store those documents in the CBUS XDMS 118, which thus serves as a data repository for those CBUS clients.

From the above description, it should be understood that while FIG. 1 shows merely a single CBUS client 116 that creates a CD document, in other embodiments, a plurality of CBUS clients, each of which can create and store one or more CD documents within the CBUS XDMS 118 are present. Additionally, to the extent that the CBUS client 116 is based upon an XDM specification, the CBUS client in at least some embodiments can be referred to as an XDM client as well.

Also, although not shown, connection between the CBUS client 116 and the CBUS XDMS 118 can be facilitated through an aggregation proxy. The aggregation proxy can serve as a routing agent such that any information from the CBUS client 116 is transferred to the aggregation proxy, which in turn can then transfer that information to the CBUS XDMS 118 using any of a variety of protocols such as, for example, the hypertext transfer protocol (HTTP). Relatedly, information from the CBUS XDMS 118 can be transferred to the CBUS client 116 via the aggregation proxy.

Assuming one or more CD documents have been stored within the CBUS XDMS 118, the CBUS client 116 can issue requests, via a communication link 124, to a CBUS server 126 for determining a CBUL based upon the conditions and/or rules specified in a selected one of those CD documents. Generally speaking, the CBUS server 126 serves multiple purposes. First, when the CBUS server 126 receives a request from the CBUS client 116 for a condition based URI list (CBUL) document, based upon that request the CBUS server in turn will fetch the CD document corresponding to the CBUL from the CBUS XDMS 118. The communication between the CBUS server 126 and the CBUS XDMS 118 can be facilitated by XCAP and/or SIP protocols, as indicated by communication links 128 and 130, respectively. Additionally, after fetching the CD document from the CBUS XDMS 118, the CBUS server 126 can authorize the CBUS client 116 making the request. The authorization is generally performed in accordance with the authorization rules provided in the CD document.

Assuming that the CBUS client 116 is in fact allowed to use the CD document, the CBUS server 126 then creates a temporary CBUL document. In particular, the CBUL document can be created by applying the selection rules specified in the CD document and accessing the information stored in the presence, location, and user profile servers 108, 110, 112 as well as possibly the other resources 114 via a plurality of communication links 132. The created CBUL document can then be provided to the CBUS client 116. In this manner, the CBUS server 126 manages and determines the creation and content of a temporary CBUL document. The CBUS server 126 additionally supports re-evaluation requests for changes to the CBUL document, as will be described in greater detail below. It should also be noted that, while only the single CBUS client 116 and single communication link 124 are shown in FIG. 1, depending upon the embodiment multiple CBUS clients can be in communication with any given CBUS server such as the CBUS server 126 by way of one or more communication links.

As indicated by a dashed box 122 encompassing the CBUS XDMS 118 and the CBUS server 126, those two servers in at least some embodiments can be considered a single device (e.g., a single server), even though those servers can be implemented as two distinct servers and even implemented as two separate servers at two different locations. In some embodiments, further, the two servers are unified as a single server device in which the functions of both of the servers are performed. Indeed, the various server devices mentioned above (e.g., the CBUS XDMS 118, the CBUS server 126, and the servers 108, 110, 112 and/or other resources 114) can take any of a variety of forms including, for example, computer systems employing multiprocessors and other processing devices. As mentioned above with respect to communications between the CBUS XDMS 118 and the CBUS client 116, communications between the CBUS client and the CBUS server 126 and between the CBUS server and the servers 100, 110, 112 and other resources 114 can be accomplished in at least some embodiments by way of one or more intermediaries such as an aggregation proxy. For this reason, the dashed box 122 can also be understood to represent such an aggregation proxy (or multiple such intermediaries).

Figure 2:
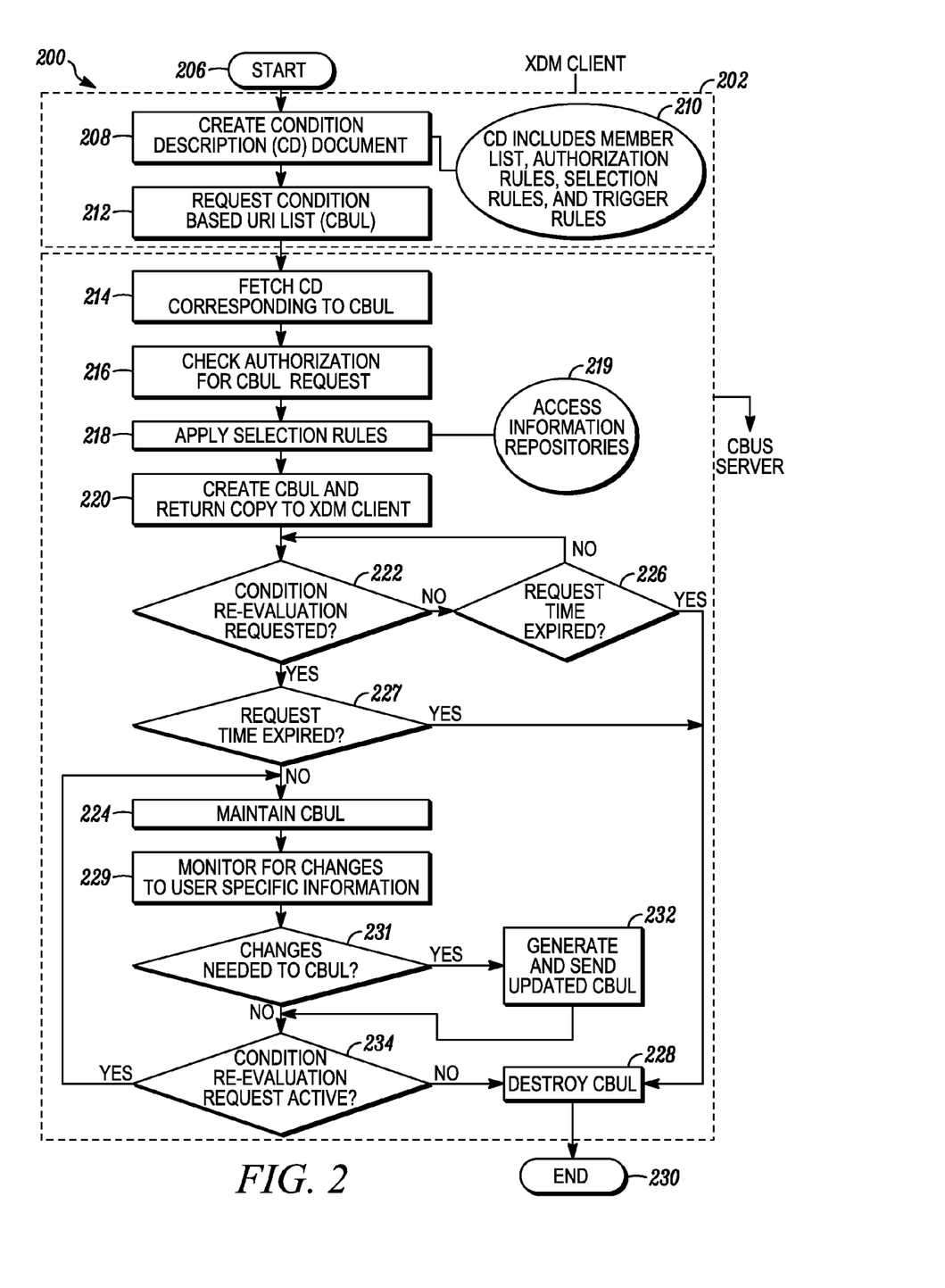
FIG. 2 is a flowchart showing exemplary steps of determining a list of users from the pool of the plurality of users that match various conditions and/or rules stored within the data network of the communication system of FIG. 1.

Turning now to FIG. 2, an exemplary flowchart 200 is provided showing various steps of operation for determining a CBUL (e.g., a subset of the plurality of users 102), in accordance with some embodiments of the present invention. In particular, the flowchart 200 provides a method for performing a condition and/or rule based URI selection (CBUS) process depending upon information provided by the plurality of users 102 to the data network 104 and a CD document created by a CBUS client such as the CBUS client 116. More particularly as shown, upon starting the method at a step 206, a CD document is created by a CBUS client and that CD document is stored in the CBUS XDMS 118 at a step 208. As discussed above and noted by a region 210, the CD document can include information such as a pre-defined member list as well as conditions and/or rules such as authorization rules, selection rules and trigger rules.

Next, at a step 212, a CBUL request (e.g., a HTTP GET request) is issued by a CBUS (or XDM) client to the CBUS server 126 for a list of users (that is, a CBUL) matching the criteria (e.g., selection rules) specified in a particular CD document. In addition, the CBUL request may include an indication that condition re-evaluation is requested (described in greater detail below). As indicated by a box 202, in the present flowchart 200 it is envisioned that both of the steps 208 and 212 are performed by the same CBUS (XDM) client, such as the CBUS client 116. Nevertheless, the CD document that is stored within the CBUS XDMS 118 need not have come from the same CBUS client as the one issuing the CBUL request. That is, steps 208 and 212 can, but need not, always involve the same CBUS 116. Subsequent to receiving the request from the CBUS client 116, the CBUS server 126 performs a plurality of operations, which are shown within another dashed box 204.

In general, the plurality of operations of the dashed box 204 that are performed by the CBUS server 126 involve retrieving and monitoring information about a plurality of users (e.g., the pre-defined member list mentioned above that is specified in the CD document), evaluating that information against the set of configurable conditions/rules specified in the CD document, and then returning the list of users that match those conditions (that is, the CBUL) back to the CBUS client 116. More particularly as shown, subsequent to receiving the request from the CBUS client 116 at the step 212, the CBUS server 126 at a step 214 fetches an appropriate CD document from the CBUS XDMS 118. The CD document corresponding to the requested CBUL is identified by information contained in the request from the CBUS client. For example, the CD document can in at least some circumstances be identified by having the same name (but different document type) as that of a CBUL document specified in the request. Although not shown in detail in FIG. 2, it is assumed in performing step 214 that a requested CBUL does not exist. Typically, a CBUL document does not exist if either a previous request for that CBUL has not ever been made or because the CBUL was created and destroyed as a consequence of expiration of another request made prior to the current request. The returned CBUL is a "virtual" XML document that is created dynamically on the CBUS server 126 when a request from the CBUS client 116 is received.

After fetching the CD document at the step 214, authorization rules in the CD document are accessed and evaluated at a step 216. As indicated earlier, the authorization rules are specified in the CD document to limit use of the CD document to only authorized CBUS clients. Thus, upon receiving the CD document, the CBUS server 126 determines if the CBUS client 116 making the request (or, in at least some circumstances, the person or entity that is associated with that device) is an authorized client specified in the CD document. The authorization rules of the CD document are particularly important in embodiments where the CD document can be created by one entity of or in communication with the data network 104 and yet accessed by other entities of or in communication with that network. In at least some embodiments where no particular authorization rules are specified by the CD document, the CBUS server 126 can revert to a default authorization policy in which all clients, or possibly some subset of potential clients, or even only the client which authored a requested CD document, has authorization to use the CD document.

Authorization is typically automatically granted to the entity creating the CD document. In the present embodiment in which the entity (e.g., the CBUS client 116) creating the CD document is the same entity (e.g., the CBUS client 116) making the CBUL request, it is assumed that CBUS client 116 is authorized to access the CD document. However, in the event that the entities creating the CD document and issuing a request are not the same, the entity issuing the request may or may not be authorized. In the event that the CBUS client 116 is not authorized, the CBUS server 126 can respond in a variety of ways (not shown in FIG. 2). For example, in at least some embodiments, the CBUS server 126 can return an error message to the requesting CBUS client 116. In other embodiments, an "access denied" message or other similar message can be sent either alone or in conjunction with an error message. Other mechanisms of notifying the unauthorized CBUS client 116 can be utilized as well.

Assuming that the CBUS client 116 requesting the CBUL document is an authorized client, the process proceeds to a step 218. At the step 218, selection rules, also specified in the CD document, are applied against any list of members (e.g., any pre-defined member list, to the extent that one exists) mentioned in the CD document. If no pre-defined member list is specified, than the selection rules are applied against a plurality of users defined by the default policy of the CBUS server (e.g., all of the users 102 within the domain of the data network 104). The selection rules can be applied, for example, by accessing information from the various back-end user information repositories, such as, the presence, location, and user profile servers 108, 110, and 112, respectively, as indicated schematically by a region 219. Selection of the users based on the conditions/rules can be performed by taking a snapshot, that is, making a one-time inspection of the user-specific information to find out whether any of the plurality of the users 102 (or any subset of the users as specified by any pre-defined member list) fulfill all of the conditions/rules or not.

Subsequent to the evaluating and applying of the selection rules, a CBUL document is created (and possibly in at least some cases cached or stored temporarily) within the CBUS server 126 at a step 220. A copy of the created CBUL document is also sent at the step 220 to the CBUS (XDM) client 116 who made the CBUL request at the step 212. The CBUL constitutes the list of those of the users 102 satisfying the conditions/rules of the CD document accessed by the CBUS server 126 at the step 214. Further, the CBUL created at the step 220 is a temporary document insofar as changes to the document are plausible depending upon the selection rules specified in the CD document. In particular, the selection rules can be based upon information of the plurality of users 102 that can change over time. For example, the selection rules can be based upon presence and location information of the plurality of users 102 that can change frequently. The selection rules can also be based on personal information that changes less often or never, for example, hobbies of the plurality of users 102. Thus, depending on the condition/rules provided as input, the content of the CBUL document can vary.

Given that in at least some embodiments some or all of the user-specific information upon which the CBUL is based is dynamic in nature, the flowchart 200 includes additional steps in which the CBUL can be updated to reflect such changes in the user-specific information (e.g., in real-time), such that the CBUL provides a list that is up-to-date in terms of identifying those users who particularly match the selection rules. In particular, at a step 222, the CBUS client 116 can request a re-evaluation of the CBUL, for example by sending a SIP SUBSCRIBE request for notification of changes made to the CBUL document. Re-evaluation typically involves re-evaluating the conditions and/or rules specified in the selection rules of the CD document against the latest available user-specific information. As an outcome of the re-evaluation, any previous evaluation results and corresponding output list can be overridden or updated.

Although in some embodiments the output list provided in response to a re-evaluation request can be a complete CBUL, In at least some other embodiments, this need not be the case. Rather, in such embodiments, the output list provided from the CBUS server 126 to the CBUS client 116, while containing updated information, merely provides supplemental information (or information showing particular changes to the original CBUL) that the CBUS client 116 can use to update the CBUL that it previously received, which it is storing locally. That is, in such embodiments, the CBUS server 126 and client 116 maintain local copies of the CBUL, and the CBUS server notifies the client of updates (does not necessarily resend the entire updated CBUL). For example, supposing that an initial CBUL provided to the CBUS client 116 listed users A, B and C, and that subsequently it was determined upon re-evaluation that user D should be added to the list, then in such case additional information output by the CBUS server 126 to the CBUS client would merely indicate that user D should be added to the CBUL rather than indicating expressly that each of users A, B, C, D should be on the CBUL. By sending re-evaluation information in this manner, over-the-air bandwidth can be conserved.

In the present embodiment, the re-evaluation request at the step 222 has to be made within a default lifetime period following the time at which the CBUL document was sent from the CBUS server 126 to (toward) the CBUS client 116 at the step 220. In this regard, FIG. 2 illustrates that, upon making a determination of whether a re-evaluation request has been made at the step 222, the process then proceeds to either a step 226 or a step 227 at which it is determined whether the default time period has expired, the process proceeding to the step 226 if no re-evaluation request was made as determined at the step 222 and the process proceeding to the step 227 if a re-evaluation request was in fact made. Thus, the process repeatedly cycles between the step 222 and the step 226 so long as a re-evaluation request has not been made and the default time period has not yet expired. The default lifetime period typically is a short period of time subsequent to the sending of the temporary CBUL document and can be, for example, 10 seconds, although this can vary depending upon the embodiment.

If at the step 222 it is determined that a re-evaluation request has not been made, but at the step 226 it is determined by the CBUS server 126 that the default lifetime period has expired, it is assumed that the temporary CBUL document created at the step 220 is no longer needed and is therefore destroyed at a step 228. After destroying the CBUL document at the step 228, the process ends at a step 230. Alternatively, if at the step 222 it is determined that a re-evaluation request was in fact made but at the step 227 it is determined by the CBUS server 126 that the default lifetime period has expired, then the process also proceeds to the step 228 at which the CBUL is destroyed and then the process ends at the step 230. However, if at the step 222 it is determined that a re-evaluation request was made and at the step 227 it is determined that the default lifetime period has not yet expired, then the process continues on to a steps 224-234.

More particularly as shown, upon proceeding from the step 227 to the step 224, the existing CBUL is not destroyed but rather continues to be maintained. Next, at a step 229 the CBUS server 126 monitors the user information repositories (e.g., the presence, location, and user profile servers 108, 110 and 112, respectively, as well as possibly the other resources 114) for any changes, additions, or updates to the user-specific information that would justify changes to the CBUL given the conditions/rules specified by the CD document upon which the CBUL was generated. The information repositories can be monitored either periodically or continuously depending upon the embodiment and the configuration of the CBUS server 126. Monitoring typically involves supervising (either continuously or periodically) the user-specific information to detect changes in that information. Monitoring can also be used to prepare for a timely action.

If at a step 231 the CBUS server 126 determines that changes have occurred in the user-specific information being monitored and that those changes should result in a change in the CBUL given the conditions/rules specified by the CD document upon which that CBUL was earlier created, the CBUS server 126 generates an updated CBUL and sends (if allowed by the trigger rules) that updated CBUL to the CBUS client 116 at a step 232, after which the process advances to the step 234. Alternatively, if at the step 231 it is determined by the CBUS server 126 that no changes have occurred to the user-specific information, or that no changes have occurred in that information that would justify changes to the CBUL, then the process advances immediately to the step 234.

At the step 234, the CBUS server 126 determines if the request for condition re-evaluation is still active. If so, the process goes back to the step 224 at which the CBUL continues to be maintained and the user information repositories monitored for updates. Alternatively, if at the step 234 it is determined that the request for condition re-evaluation is no longer active (e.g. subscription from the CBUS client 116 to the CBUS server 126 for notification of changes to the CBUL document has expired), the CBUL is destroyed at the step 228 and the process ends at the step 230.

Although in the above description the re-evaluation request involves a specific communication being provided by the CBUS client 116 as determined at the step 222 (e.g., a specific communication in addition to the initial request of the step 212), in at least some alternate embodiments the CBUS server 126 can determine that condition re-evaluation is requested from an indication received in step 212, from the CD document fetched in the step 214, or otherwise (e.g., prior to the step 218). By requesting re-evaluation in this manner, among other things, the CBUS server 126 is better able to optimize how it collects information from the back-end information repositories (e.g., the repositories accessed in the step 219).

Assuming that re-evaluation request(s) are determined in this manner, the process of the flowchart 200 can take a slightly different form, as follows. More particularly, in the step 212 (or possibly 214), the CBUS server 126 determines that re-evaluation will be needed. If the CBUS server 126 knows at the step 212 (or 214) rather than at the step 222 that re-evaluation is desired, then it can behave more efficiently at the step 218 (e.g., rather than merely fetching information from the information repositories, it both fetches data from those repositories and also requests updates to the information in the same transaction). As a consequence, at the step 222 the CBUS server further is able to immediately determine that condition re-evaluation is requested (based on the indication received in 212) and the timer is not really relevant. That is, assuming that re-evaluation requests are determined without any explicit re-evaluation communication being necessary between the CBUS client 116 and the CBUS server 126, and rather are understood by the CBUS server as being required based upon the request of the step 212 or otherwise, the process can advance directly from the step 222 through the step 227 to the step 224.

Figure 3A:
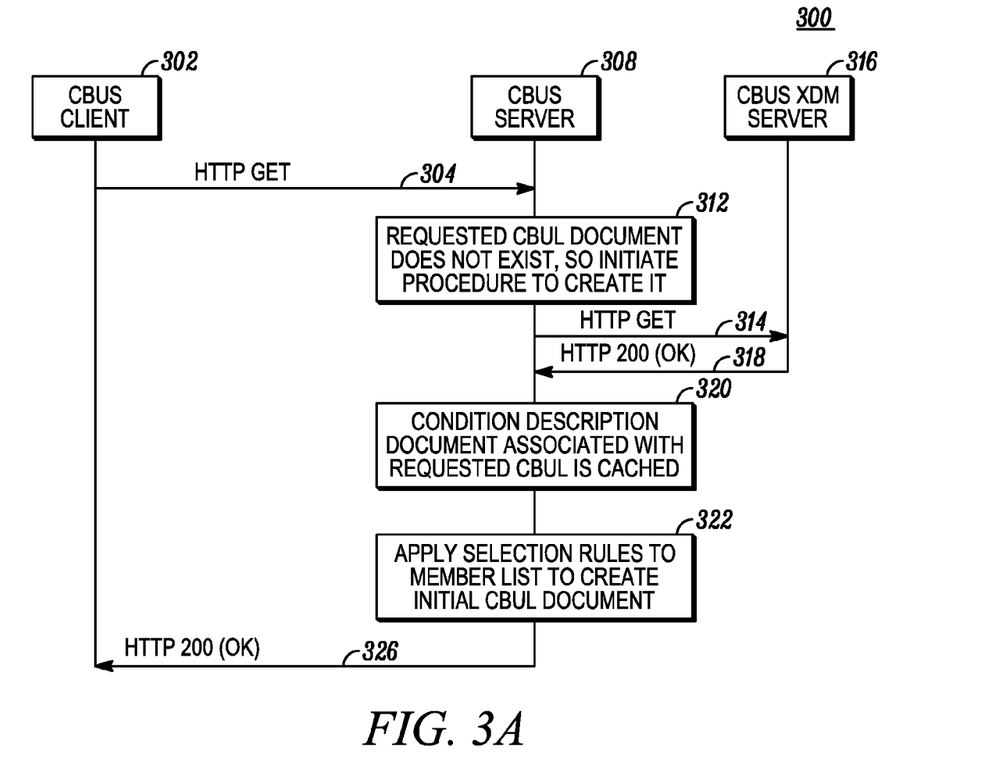
FIGS. 3A and 3B are sequence diagrams showing an exemplary use case corresponding to the various steps of the flowchart of FIG. 2.
Figure 3B:
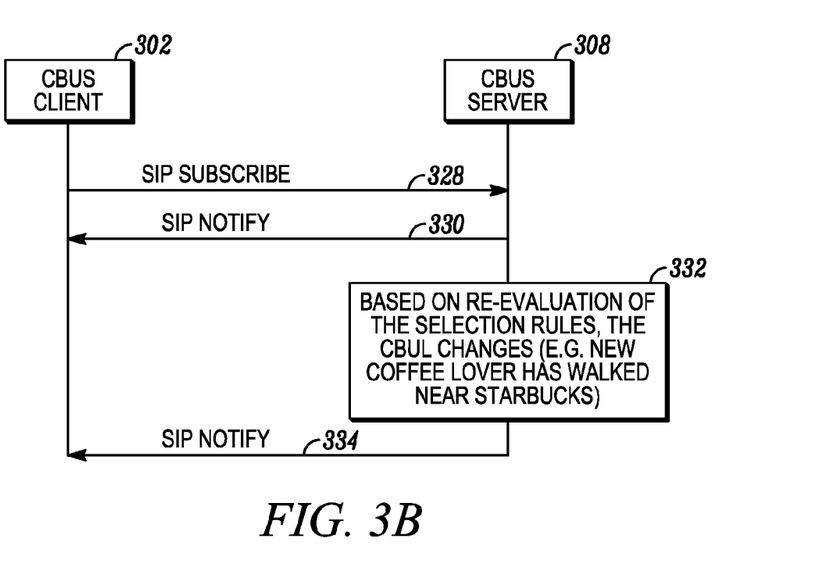

Referring now to FIGS. 3A and 3B in conjunction with the flowchart 200 of FIG. 2, signal diagrams are provided that show an exemplary use case 300 corresponding to the various steps of the flowchart 200, in accordance with at least one embodiment of the present invention. The use case 300 describes the determination of a list (e.g., the determination of a CBUL including a subset of the plurality of users 102) for which certain conditions and/or rules are satisfied. More particularly, in the present example, the use case 300 can involve a mobile advertiser looking to send a Starbucks advertisement (e.g., $1 off e-coupon) to users who like coffee, are available (e.g. have an active registration with data network 104), and are within 200 meters of a Starbucks outlet.

In the present example, given that the mobile advertiser is seeking a CBUL concerning users that match certain predefined or configurable conditions and/or rules, the mobile advertiser can be understood to constitute a CBUS client such as the CBUS client 116 shown in FIG. 1, and in FIGS. 3A-3B in particular is shown as a CBUS client 302. Further as shown and further discussed below, the CBUS client 302 communicates with a CBUS server 308, which can be understood to correspond to the CBUS server 126 of FIG. 1. Additionally, the CBUS client 302 in turn is in communication with a CBUS XDMS 316, which can be understood to correspond to the CBUS XDMS 118 of FIG. 1.

As discussed above, to obtain a CBUL identifying the users that satisfy particular criteria such as the above-mentioned criteria (that is, where the user likes coffee, is "available", and is located within 200 meters of a Starbucks outlet), a CD document defining those criteria must be available. Although not shown in FIGS. 3A-3B, it is assumed for purposes of the use case 300 that such a CD document exists and has been stored at the CBUS XDMS 316, either because the CBUS client 302 has created such a CD document and provided it to the CBUS XDMS, or because the CD document has otherwise been created (e.g., by another entity) and stored at the CBUS XDMS.

Assuming that such a CD document has been created and stored, a CBUL request for users complying with the conditions/rules of that CD document can be issued by the CBUS client 302, as indicated by a signal 304 (e.g., HTTP GET). The issuance of the CBUL request corresponds to the step 212 of FIG. 2. As shown, the signal 304 communicating the request is routed to the CBUS server 308. The CBUS server 308 then proceeds to make a determination as to whether the requested CBUL already exists (e.g., is being maintained or not). In the present example, as indicated by the block 312, the requested CBUL does not exist at the CBUS server 308, and so a further signal 314 is provided from the CBUS 308 to the CBUS XDMS 316.

The CBUS XDMS 316 upon receiving the further signal 314 retrieves from its memory a CD document corresponding to the CBUL request (for example, based upon the name of the CBUL document specified in the request received from the CBUS client 302) and sends a signal 318 back to the CBUS server including that CD document (e.g., tagged in the body of an HTTP 200 (OK) signal). The signals 314, 318 thus accomplish the fetching of the CD document from the CBUS XDMS 316 corresponding to the step 214 of the flowchart 200. Upon receiving the CD document from the CBUS XDMS 316, the CBUS server 308 caches the CD document as indicated by a block 320. Further as indicated by the block 320, and in accordance with the step 216 of FIG. 2, the CBUS server 308 also determines if the CBUS client 302 is an authorized user of that CD document, in accordance with any authorization rules of the CD document. If the creator of the CD document was in fact the CBUS client 302, that CBUS client then would be authorized to use that document.

Subsequent to the authorizing of the CBUS client 302, the CBUS server 308 evaluates and applies the selection rules against the member list for creating a CBUL document, as indicated in a block 322 and as corresponds to the step 218 of FIG. 2. For example, the member list might include a subset of the plurality of users 102 that have "opted in" to receiving mobile advertisements, e.g. in exchange for a discounted wireless service package. As discussed earlier, both the member list and the selection rules applied against the member list are typically defined in the CD document that was fetched from the CBUS XDMS 316. More particularly, in the present example in which the CBUS client 302/mobile advertiser wishes to send a Starbucks e-coupon to coffee-loving users that are "available" and located within 200 meters of a Starbucks outlet, the application of the selection rules begins by obtaining, at the CBUS server 308, the presence information from the presence server 108 (see FIG. 1) for each of the users specified within the member list. By virtue of accessing the presence information, the users from the member list who are "available" can be determined. Subsequent to finding the "available" members, the user profile information from the user profile server 112 can be accessed for those members. Within the user profile of the "available" members, it can be determined if any of those members like coffee. For the coffee lovers who are "available," the location information from the location server 110 can then be accessed to determine if any of those users are within the specified distance (e.g., 200 meters) of the location of any Starbucks outlet.

Thus, by virtue of accessing the presence, user profile, and location information of the users, the users that satisfy each of the three different types of conditions/rules can be identified. It should also be noted that, notwithstanding the above-described order of applying the different selection rules (e.g., first with respect to presence, then with respect to user profile, and finally with respect to location), the selection rules can be applied in an order different from that mentioned above. Also, in other embodiments, a different number of types of conditions/rules than three different types of rules (e.g., only one or two types of condition/rules such as location and presence-related rules, but not a user profile rule) are applied. Upon applying the selection conditions/rules and determining those of the users which satisfy those conditions/rules, the CBUL document is created and provided back to the requesting CBUS client 320, in correspondence with the step 220 of FIG. 2. As shown, in the present embodiment, the CBUL is transferred from the CBUS server 308 to the CBUS client 302 by way of a signal 326 that is sent from the CBUS server to the CBUS client.

As discussed above, the selection conditions/rules specified in the CD document concern information that in at least some embodiments is capable of dynamically changing over time (e.g., presence, location, user profile information). For example, in relation to the above example, a user currently "available" but not within 200 meters of a Starbucks may potentially move into the specified range (e.g., into a region within the 200 meter range of a Starbucks location), or additional users may be added to the pre-defined member list as they "opt in" to the mobile advertising service. Thus, in accordance with at least some embodiments of the present invention, the presently-described system allows for the CBUS client 302 to request one or more repeated re-evaluations of the CBUL so that the CBUS client can know in real-time when new users match the specified criteria or, alternatively, when a user no longer matches.

Further in this regard, and particularly referring to FIG. 3B, the use case 300 further shows exemplary signals communicated between the CBUS client 302 and the CBUS server 308 in revising a CBUL in response to such a re-evaluation request. As shown, subsequent to receiving the CBUL as shown in FIG. 3A, the CBUS client 302 can then issue a re-evaluation request to the CBUS server 308 by way of sending a signal 328 to the CBUS server, as corresponds to the step 222 of FIG. 2. Upon receipt of the re-evaluation request as communicated by the signal 328, assuming that the re-evaluation request was sent within a limited time period following the sending of the most recent previously-sent CBUL (e.g., in accordance with the steps 226, 227 of FIG. 2), the CBUS server 308 issues an acknowledgement signal 330 (e.g., SIP NOTIFY) with an initial reference to the latest CBUL document (e.g., the CBUL document created in FIG. 3A).

In addition to sending the acknowledgement signal 330, the CBUS server 308 additionally monitors the user-specific information to determine if any changes to the CBUL have occurred and makes those changes as appropriate, as indicated in information block 332 and as corresponds to the steps 229-232 of FIG. 2. For example, a change is noted (e.g., when a new "available" coffee lover walks within 200 meters of a Starbucks location), the CBUS server 308 dynamically updates the CBUL. When the CBUL has been updated, a revised CBUL signal 334 (e.g., again a SIP NOTIFY signal) including the modified/updated CBUL is sent to the CBUS client 302, as corresponds to the step 232 of FIG. 2. The CBUS server also evaluates and applies trigger rules describing when a modified CBUL is to be sent to the CBUS client, for example, when new users are added to the CBUL albeit, in this example, not when existing users are removed from the CBUL (since that information is not of interest in this particular embodiment, although it might be of interest in other embodiments). The process of re-evaluation continues so long as the request for re-evaluation from the CBUS client 302 remains active, as corresponds to the step 234 of FIG. 2. Subsequent to the expiration of the request, the CBUL is destroyed in accordance with the step 228 of FIG. 2.

Notwithstanding the embodiments described above with respect to FIGS. 1-3B, several other features including various refinements to the features described above are contemplated and encompassed within the scope of the invention. For example, although the present embodiment has been discussed with respect to a single CBUS client, it will be understood that the embodiments of the invention are equally applicable to a communication system having a plurality of CBUS clients, with each client capable of CBUL requests to the CBUS servers and accessing and creating CD documents in the CBUS XDMS. Also, various conventional systems and components that are commonly provided in XDM systems can be provided in the various embodiments of the present invention. It should also be understood that one or more of the plurality of users providing presence, user-profile and location information can in at least some embodiments be the CBUS clients themselves. Also, while in at least some embodiments or circumstances a given CD document is created by the same client as then issues a request (or a re-evaluation request) for a CBUL that utilizes that CD document, such that the CD document can be considered one that is "configured by the request initiator", in other embodiments or circumstances the CD document will have been created by a different client or entity than that which is issuing a request.

At least some embodiments of the present invention are particularly advantageous insofar as the condition based URI selection (CBUS) functionality provides the capability of selecting individual users based upon whether those users satisfy multiple different types of configurable conditions and/or rules (that is, different rules concerning different qualitative characteristics). By applying multiple different types of conditions/rules, personalized services can be provided. Further, at least some embodiments of the present invention allow for monitoring of the different users and updating of the users that are selected, so as to reflect how the characteristics of those users vary with time. Thus, the CBUL need not be a static, unchanging document but rather can be a real-time or largely real-time document reflecting ongoing user changes. Also, in at least some embodiments of the present invention in which the CBULs are only maintained for a certain period of time and/or destroyed after usage, resources of the CBUS server are preserved.

Embodiments of the present invention are intended for use in conjunction with a variety of different types of clients (and/or users) and servers. Use cases for the CBUS functionality can include Dynamic Push-to-Talk (PoC) groups, invitation reservation, mobile advertising, and crisis handling. The CBUS functionality can additionally be employed for a wide variety of applications other than those mentioned above.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method comprising:
   receiving at a first server device a request for a condition based URI list (CBUL) regarding which of a plurality of users satisfies a plurality of conditions respectively relating to a plurality of user characteristics, the request being received from a first client device via a network;
   obtaining at the first server device a specification of the conditions;
   accessing at least one repository in which is stored information regarding the plurality of users to obtain at least some of the information, the information concerning the plurality of user characteristics of the plurality of users;
   making a determination as to which of the plurality of users satisfies the plurality of conditions;
   sending the CBUL regarding the determination for receipt by the first client device;
   receiving a re-evaluation request from the first client within a period of time subsequent to the sending of the CBUL;
   obtaining updated information concerning the plurality of user characteristics from the at least one repository;
   making an additional determination as to which of the plurality of users satisfies the plurality of conditions; and
   sending an updated CBUL regarding the additional determination for receipt by the first client device.

2. The method of claim 1, wherein the plurality of user characteristics include one or more of user presence information, user location information and user profile information, and wherein the plurality of conditions relate respectively to the respective user characteristics.

3. The method of claim 2, wherein the updated CBUL includes a list including at least one of the plurality of users that satisfies each respective condition relating to the respective user characteristic.

4. The method of claim 2, wherein the specification of the conditions is received from a second server device distinct from the first server device.

5. The method of claim 4, wherein the specification of the conditions received from the second server device was originally provided to the second server device from the first client device.

6. The method of claim 1, wherein the specification of the conditions additionally includes at least one of an authorization rule and a trigger rule.

7. The method of claim 6, wherein the specification of the conditions includes the authorization rule, and wherein the accessing of the at least one repository does not occur if the first server device determines that the first client device does not satisfy the at least one authorization rule.

8. The method of claim 6, wherein the specification of the conditions includes the trigger rule, and wherein the trigger rule determines at least one requirement that must be met.

9. The method of claim 1, wherein it is determined that more than one of the plurality of users satisfies the plurality of conditions, wherein the specification of the conditions additionally includes a pre-defined member list, and wherein the plurality of users is limited to those in the pre-defined member list.

10. The method of claim 1, further comprising:
    sending the CBUL regarding the determination from the first server device to the first client device prior to the obtaining of the updated information from the at least one repository.

11. The method of claim 10, further comprising:
    determining whether a time period has expired subsequent to the sending of the CBUL regarding the determination, wherein the sending of the updated CBUL is only provided when the time period is determined to have not yet expired.

12. The method of claim 10, wherein the updated CBUL is provided back to the first client only if the re-evaluation request of the first client is still active.

13. The method of claim 10, wherein the re-evaluation request is received from the first client prior to the sending of the CBUL regarding the determination, and wherein the first client device is one of the plurality of users.

14. The method of claim 10, wherein one of the following is true:
    (i) upon receiving the re-evaluation request prior to the sending of the CBUL regarding the determination, the accessing of the at least one repository includes both obtaining current information and requesting updated information concerning the plurality of user characteristics of the plurality of users;

(ii) if the re-evaluation request is not received prior to the sending of the CBUL regarding the determination, the accessing of the at least one repository only includes obtaining current information concerning the plurality of user characteristics of the plurality of users.

15. The method of claim 1, wherein the plurality of user characteristics include each of user presences, user locations and user preferences, and wherein the plurality of conditions relate respectively to the respective user characteristics.

16. The method of claim 1, wherein the specification of the conditions is obtaining from an additional server device coupled to the first server device.

17. The method of claim 16, wherein the first and additional server devices, and the at least one repository, are included within and form parts of a data network.

* * * * *